United States Patent [19]

Lenz

[11] Patent Number: 5,050,913
[45] Date of Patent: Sep. 24, 1991

[54] HIGH PRESSURE, ROTATABLE PIPE JOINTS

[76] Inventor: Erwin Lenz, 180 Cabrini Blvd., New York, N.Y. 10033

[21] Appl. No.: 513,603

[22] Filed: Apr. 24, 1990

Related U.S. Application Data

[60] Continuation-in-part of Ser. No. 501,548, Mar. 30, 1990, Pat. No. 4,977,744, which is a division of Ser. No. 294,418, Jan. 9, 1989, Pat. No. 4,934,423.

[51] Int. Cl.$^5$ .................................. F16L 27/113
[52] U.S. Cl. .................................. 285/279; 285/281; 285/332; 285/332.1; 285/363
[58] Field of Search ............ 285/267, 268, 279, 332.1, 285/281, 368, 379, 332, 15, 45, 235, 335, 369, 363; 277/5, 30, 97, 98, 100, 168, 169, 170, 171

[56] References Cited

U.S. PATENT DOCUMENTS

| | | | |
|---|---|---|---|
| 861,828 | 7/1907 | Grindrod et al. | 285/332 X |
| 974,975 | 11/1910 | Kelly | 285/332.1 X |
| 1,232,129 | 7/1917 | Wafer | 285/332 X |
| 3,226,821 | 8/1966 | Safford | 285/369 X |
| 4,188,784 | 2/1980 | Hall | 285/268 X |
| 4,277,092 | 7/1981 | Viers | 285/268 X |

FOREIGN PATENT DOCUMENTS

| | | | |
|---|---|---|---|
| 0200430 | 12/1938 | Sweden | 285/267 |
| 0018960 | 8/1906 | United Kingdom | 285/332 |

*Primary Examiner*—Dave W. Arola
*Assistant Examiner*—Heather Chun
*Attorney, Agent, or Firm*—Barry G. Magidoff

[57] ABSTRACT

There is provided rotatable pressure tight pipe joints and non-rotatable pressure tight pipe joints. The rotatable pressure tight pipe joints preferably have mating spherical surfaces with a sealing ring overlapping the joint between two pipe ends and compression means resiliently holding the two body parts of the joint in contact. In the non-rotatable joints, the intersecting surfaces form a zigzag cross-section and are compressibly clamped together.

5 Claims, 7 Drawing Sheets

HIGH PRESSURE, ROTATABLE PIPE JOINTS

This is a continuation-in-part of copending application Ser. No. 501,548, filed March 30, 1990, now U.S. Pat. No. 4,977,744 which, in turn, is a division of application Ser. No. 294,418, filed Jun. 1, 1989, now U.S. Pat. No. 4,934,423.

This invention relates generally to pressure-tight pipe joints and more particularly relates to pressure-tight rotatable as well as non-rotatable such pipe joints suitable for use on pipes and other conduits containing fluids under elevated pressures.

BACKGROUND OF THE INVENTION

The art has had difficulty in providing for pressure-tight connections for systems requiring relative rotary motion at pipe joints; for example, in solar energy systems which continuously rotate to track the solar movement, or in rotary drive systems where a pressurized fluid must be conveyed to a rotating circumferential surface from a stationary hub, maintaining a pressure-tight seal at the line of relative movement has not been wholly successful. In many such situations it is desirable, or necessary, to maintain the seal over lengthy period of time, when wear becomes a problem, or to avoid contamination of the fluid.

SUMMARY OF THE INVENTION

It is an object of the present invention to provide an improved pressure-tight, rotatable pipe joint. It is a further object of this invention to provide relatively simple, pressure-tight means to connect the rotatable pipe joint to a piping system. It is yet another object of this invention to provide such pipe joint means in which the contact surfaces are of substantially all of the same material as the remainder of the piping system.

In accordance with this invention a swivel pipe joint is provided which can maintain a pressure tight seal during pivoting through at least substantially 360°, the joint comprises a pair of mating, mutually rotatable, converging surfaces in overlapping contact, each surface defining a space having a circular cross-section in a plane transverse to the pipe longitudinal axis, and being formed at one end, respectively, of two adjoining body parts; compression means resiliently holding the pair of surfaces in mutually rotatable contact; and second connection means at the second end of each body part designed for non-rotating pressure-tight connection to a pipe end. The second connection means, in accordance with the further improvement of the present invention, comprises a tapered, double-beveled end ring, designed to mate into a corresponding concave, female member. The mating beveled ends are then secured together, as with bolts.

DETAILED DESCRIPTIONS OF THE PREFERRED EMBODIMENTS

Figure 1:
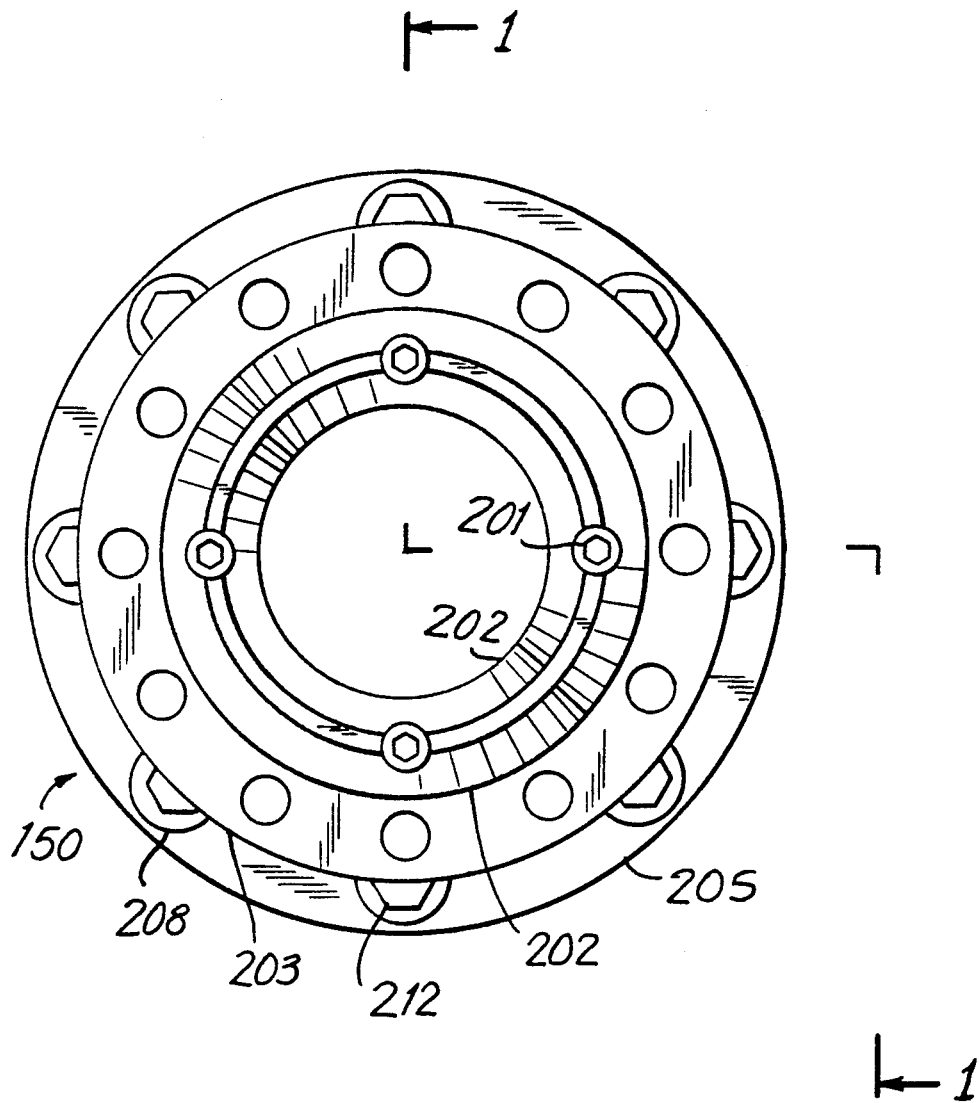
FIG. 1 is an end view of a swivel joint of one embodiment of this invention for use with a pipe of at least 1.5 inches internal diameter.
Figure 2:
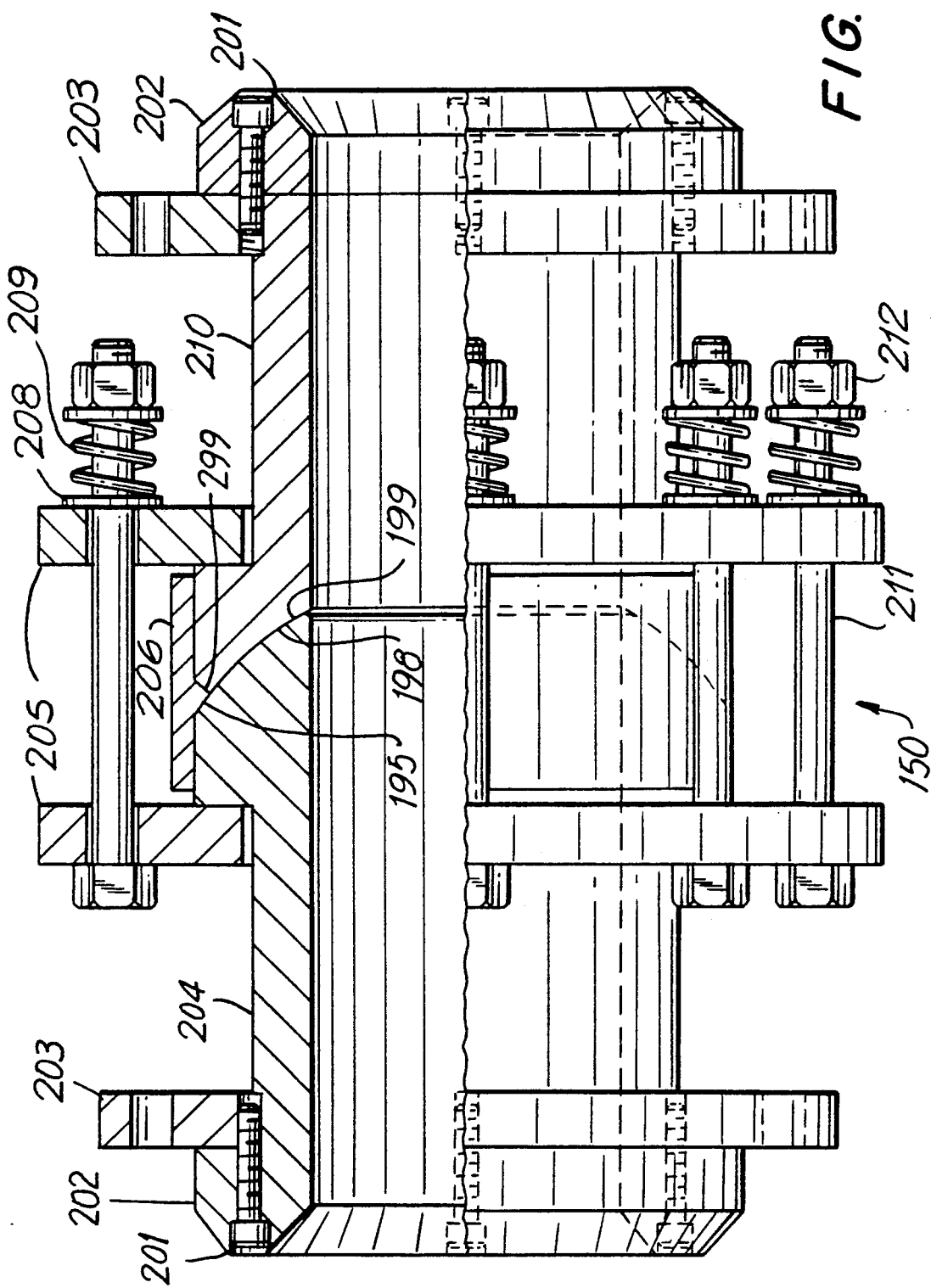
FIG. 2 is a partial cross-section view of the swivel joint of FIG. 1 taken along lines 1—1.

Referring to FIGS. 1 and 2, one embodiment of a swivel joint, generally indicated by the numeral 150, is shown in detail. What may be referred to as "conical" surfaces 198, 199 are, in this instance, surfaces of a spherical segment. In general, for high pressure pipes, a non-linear conical surface, such as a spherical segment or a segment of another surface of revolution in which the cross-sectional diameter decreases away from the outer edge of the body part, such as a segment of a paraboloid of revolution is provided. In this case, the swivel joint comprises the two coaxial, male and female, body parts 204, 210 respectively, which are held together in full contact along the carefully ground and smooth, case-hardened spherical segment external tapered circumferential surface 198, and internal tapered circumferential surface 199 respectively.

Tightly fitted over and around the intersections of the two coaxial ends of the body parts 204, 210 is an annular slip fit sealing member, or pressure ring 206. The pressure ring 206 includes a wedge-shaped protrusion 195, which fits within a complementary depression formed at the interface of the two body parts 204, 210, in contact with the largest diameter portion of the external tapered surface 198 and the bevel surface 299 at the end of the body part 210. The pressure ring 206 can be formed, for example, of brass, monel or bronze, and the ring and wedge together serve as an additional pressure fitting to prevent leakage past the contacting, ground conical surfaces 198, 199.

The mating portions of the body parts 204, 210 are formed within the major diameter end portions; encircling each of the body parts 204, 210, and abutting against the end portions, is a loose circular flange 205, rotatable with respect to the body parts, 204, 210. The two body parts, 204, 210 are clamped together by the flange members 205, utilizing spring-loaded nuts and bolts 211, 212, which are resiliently held together by coil springs 209, surrounding each of the bolts 211.

Further, in accordance with the present invention, improved pressure fit connections between the swivel joint 150 and the adjoining high pressure pipe ends are provided utilizing the wedge-shaped ring members 202, secured at each axial end of the swivel joint section 150. The wedge-shaped rings 202 are each secured to the body parts 204, 210 by four socket head screws 201. Adjacent the rings 202, are flanges 203 which are also secured to the body parts by the socket head screws 201. When connecting the pivot joint 150 to pipe ends, the adjoining two ends of the pipes are provided with mating female, or concave, rings into which the wedge-shaped rings 202 will tightly fit.

Figure 5:
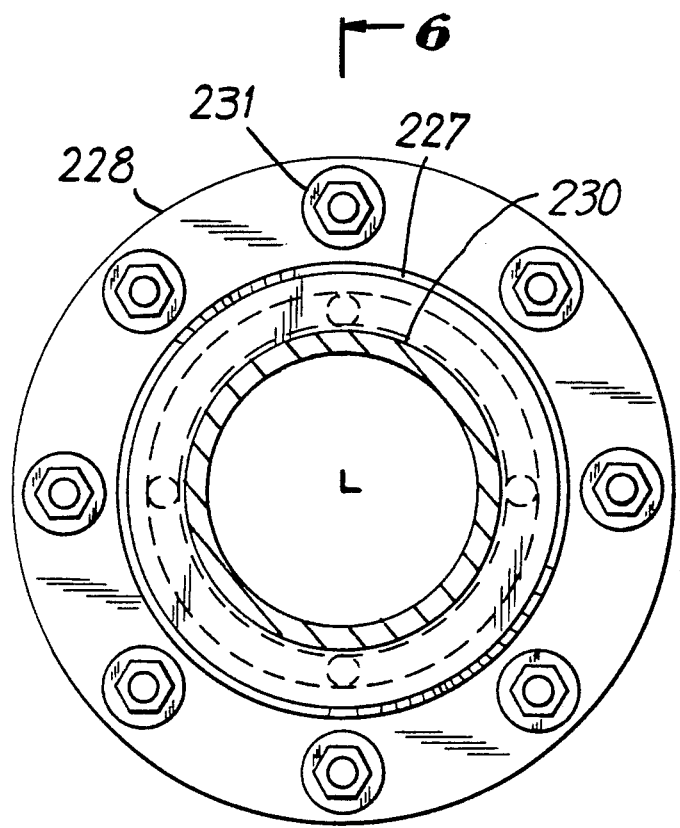
FIG. 5 is an end view in cross-section of a non-rotatable connector joint of the present invention for pipes having an internal diameter of at least 1.5 inches.
Figure 6:
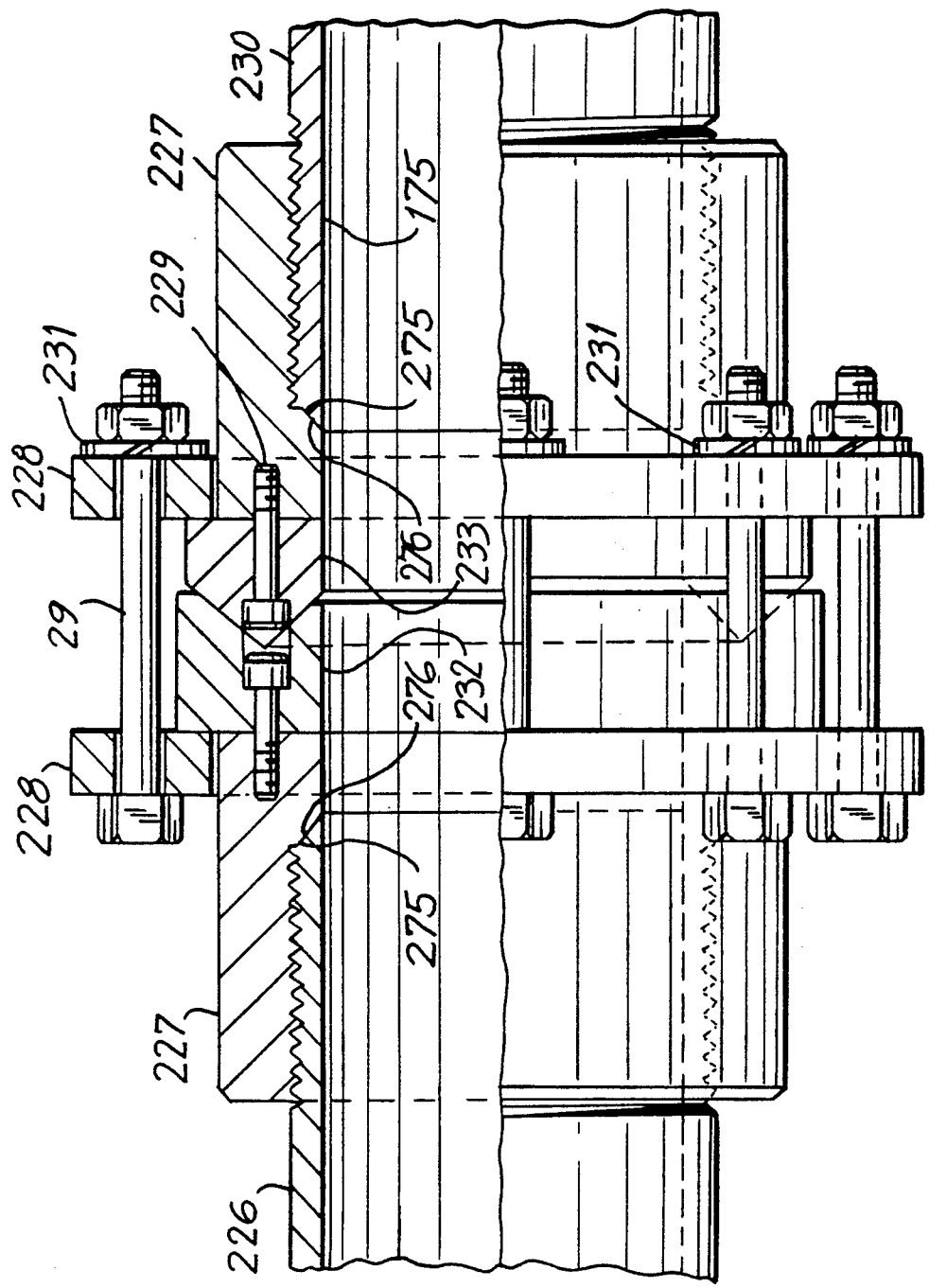
FIG. 6 is a partial cross-section taken along lines 6—6 of FIG. 5.

Another embodiment of such a non-rotatable pipe connection is shown in FIGS. 5 and 6 for pipes of at least 1.5 inches in diameter. The swivel joint body part 230, or other pipe part, has an externally threaded end portion 175 with a normal pipe bevel at the end. A similar external thread and bevel 275 is applied to the pipe end 226. Threadedly secured about each of the swivel joint body part ends 175 and about the pipe end 226 is an internally threaded coupling member 227, which also includes an internal bevel 276 designed to mate with the pipe bevel 275. Secured to each of the coupling members 227 is a mating ring member 232, 233, one of which is a tapered male wedge shaped member 233 and the second is a mating concave female member 232.

It should be noted that it is not critical whether the male and female ring members 232, 233 are connected to the parts shown or are reversed. In each case, the mating ring members, 232, 233 are secured to the coupling member 227 by socket headed screws 229, or may be integrally formed therewith.

Preferably, the axial cross-sectional shape of the male sealing ring member 233 is a truncated triangle, and the female ring member has a mating channel. Flange members 228 are butted against the sealing ring members 232, 233 and are coaxial with the coupling members 227. The flanges are secured together, as shown, utilizing the nuts and bolts 29 including a lock washer 231, with each bolt 29.

Figure 3:
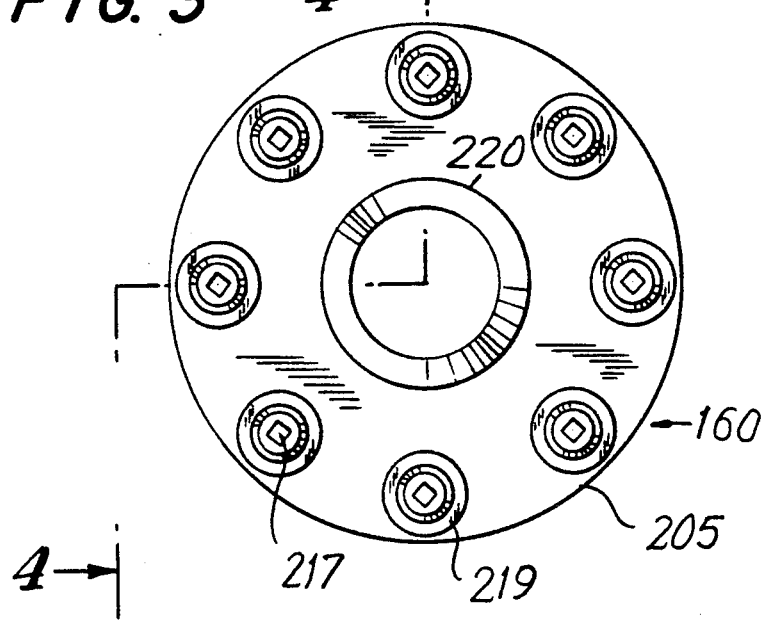
FIG. 3 is an end view of a second embodiment of a swivel joint of the present invention, including also a non-rotatable joint according to this invention.
Figure 4:
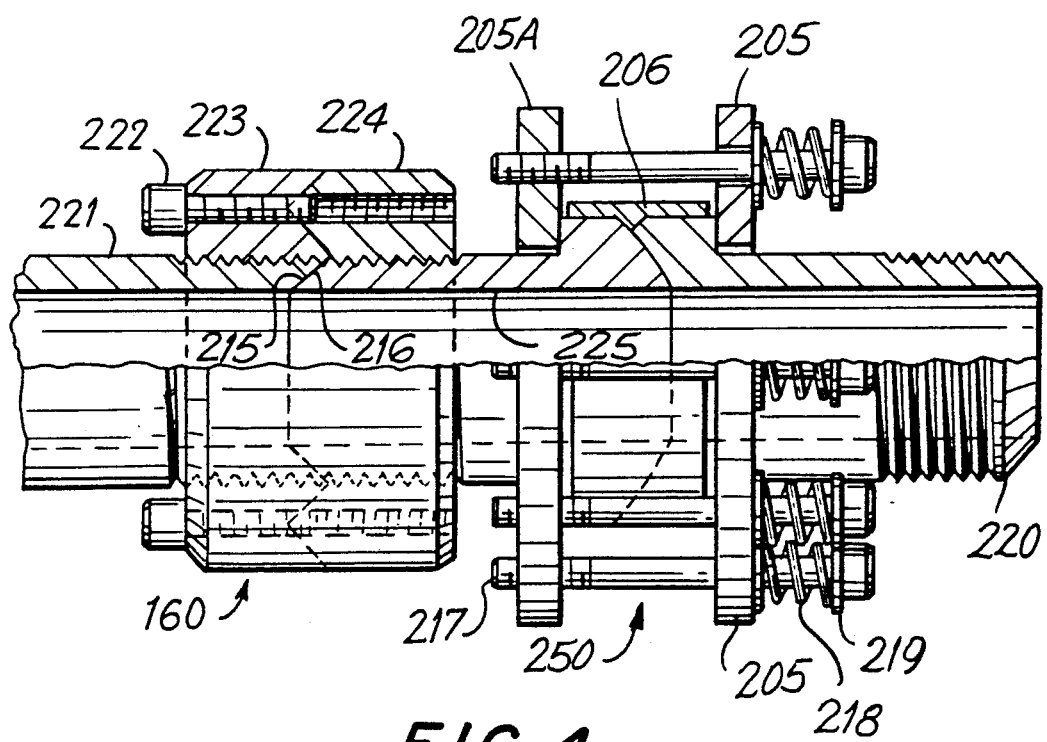
FIG. 4 is a partial cross-section view of the swivel joint embodiment of FIG. 3 taken along lines 4—4.

FIGS. 3 and 4 include a swivel joint 250, as well as another embodiment of the metal-to-metal pipe joints between the swivel joint and the adjacent pipe end, especially adapted for relatively small diameter of pipe, the relatively larger hex-head bolts are replaced by socket head screws 218 held in place by internal threads within the flange 205a.

Figure 7:
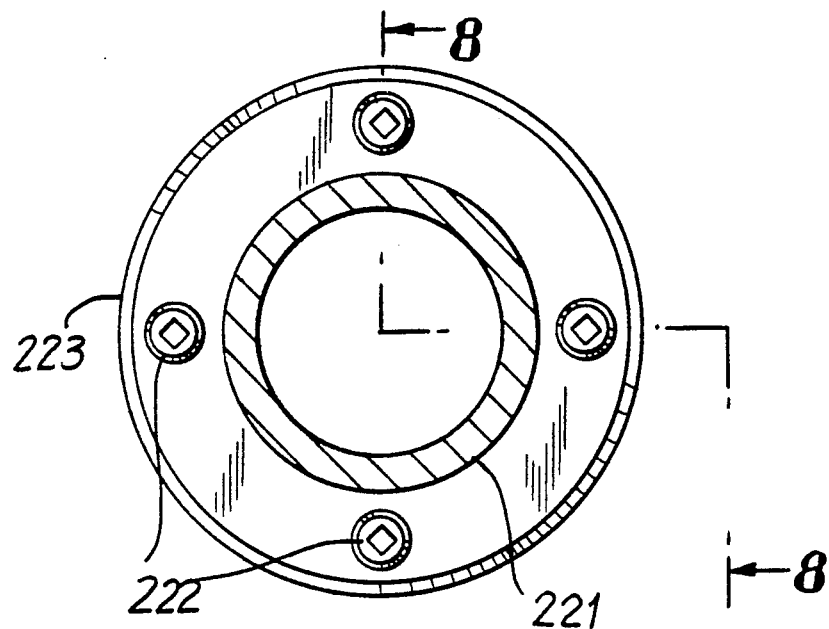
FIG. 7 is an end view of another embodiment of a non-rotatable pipe joint connector in accordance with this invention, for pipes of an internal diameter up to about 1.5 inches.
Figure 8:
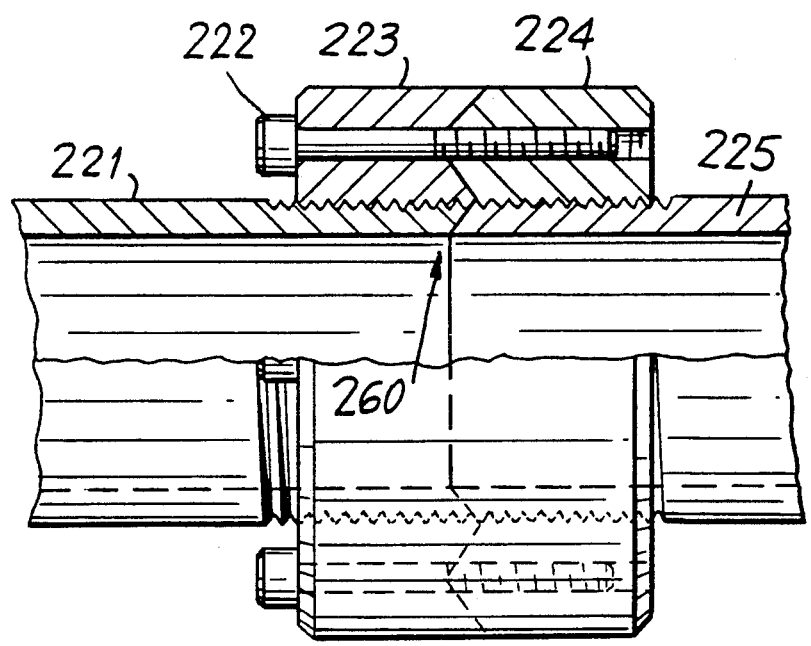
FIG. 8 is a partial cross-section view, taken along lines 8—8 of FIG. 7.
Figure 9:
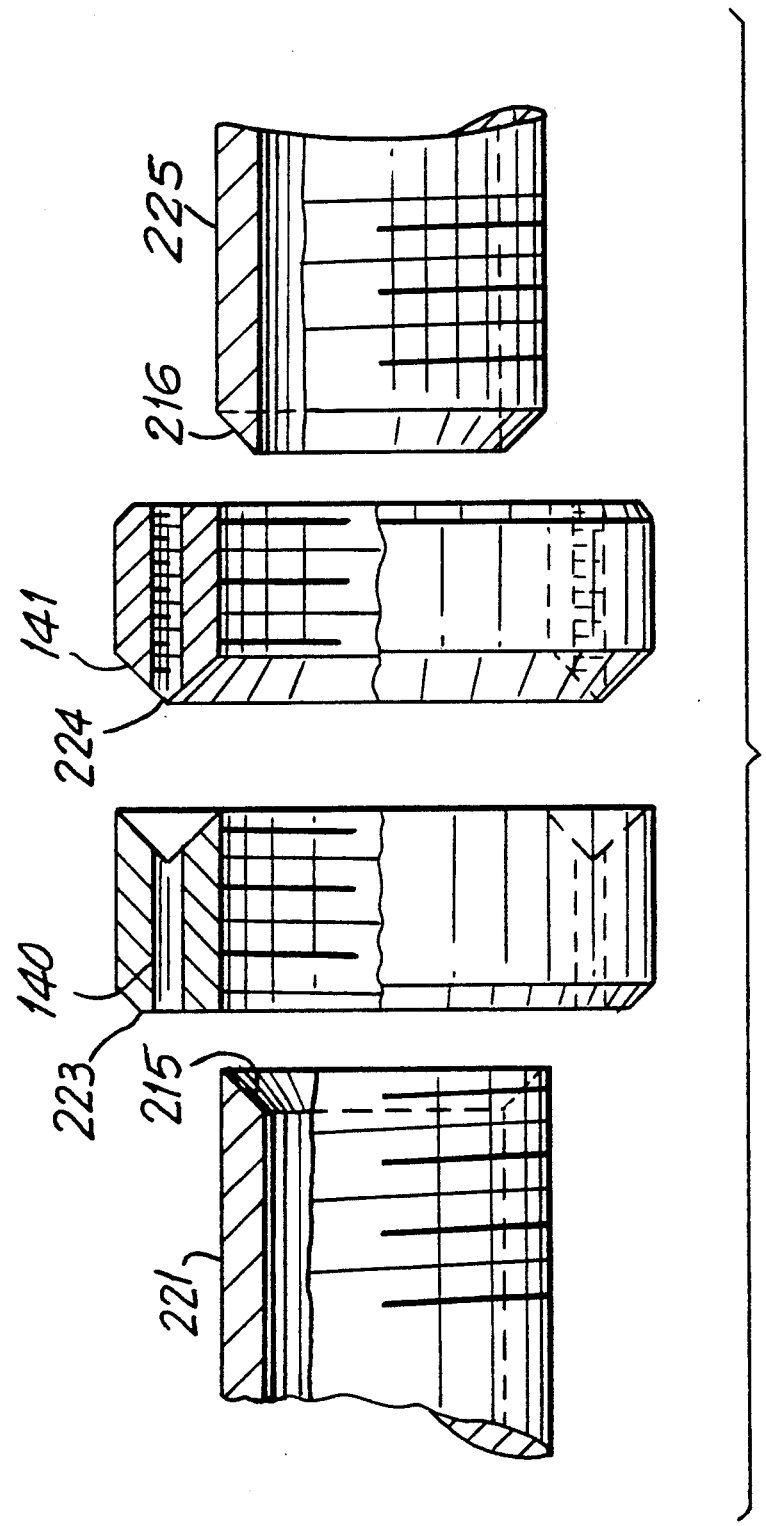
FIG. 9 is an exploded view of the principle parts of the connector joint of FIG. 7.

The metal-to-metal pipe joint generally indicated by the numeral 160, is shown in greater detail in FIGS. 7, 8 and 9. The swivel joint body part 225 and the pipe end 221 are externally threaded at their adjacent ends, and in this case the body part 225 has an end bevel 216 and the pipe end 221 has an internal, or counterbore, bevel 215. In forming this metal-to-metal joint, the coupling members 223, 224 are threaded onto the respective ends of the body member 225 and pipe end 221. The outside threading on the pipe end 221 and body part 225 are longer than the internal threads on the coupling members 223, 224 respectively, such that when the coupling members are threaded onto the pipe end 221 and body part 225 respectively the respective beveled end portions protrude. The beveled ends 215, 216 are then brought into contact such that the bevel 216 fits firmly within the counterbore bevel surface 215. The two coupling members 223, 224 are then respectively rotated such that the male portion 224 seats within the female coupling member 223. The coupling members 223, 224 are than rotated until they are pressed tightly together and the bores 140, 141 are in alignment. The socket head screws 222 are than set into the bores 140 and secured to the internal threaded bore 141. A structurally strong and pressure tight seal is thus formed comprising only metal-to-metal contact surfaces.

This type of bolted on connector between the swivel joint and the adjoining pipe provides a seal substantially as pressure tight as can be obtained by welding pipes but are more readily separable for maintenance or replacement, or other reasons. The abutting metal surfaces, if desired, can also be coated with, or separated by, a thin film of, e.g., teflon or epoxy.

The patentable embodiments of this invention which are claimed are as follows:

1. A sealed pipe swivel joint permitting substantially 360° of rotation between two interconnected fluid-carrying pipe ends and capable of carrying liquids under elevated pressure, the swivel joint comprising mutually rotatable first and second in-line metallic body parts, each having first and second ends, a smooth, externally tapered circumferential, spherical metal surface extending from the first end of the first body part towards the second end of said first body part, such that the external diameter continuously increases in a direction away from the first end to a maximum diameter, and a smooth, internal tapered circumferential spherical metal surface extending from the first end of the second body part towards the second end of said second body part, such that the internal diameter constantly decreases away from such first end to a minimum internal diameter, the two tapered circumferential metal surface mating in concentric, mutual overlapping contact; an external bevel surface at the first end of the second body part, defining an annular concavity together with said external tapered circumferential surface; an annular, slip-fit metal sealing member having an internal circumferential surface in slidable, circumscribing, overlapping contact with the first ends of the two body parts, and concentric with the tapered circumferential metal surfaces, and a wedge-shaped metal annulus integral with and protruding radially inwardly from the internal circumferential metal surface of the sealing member, mating with the annular concavity; compression means resiliently holding the two body parts in contact along the respective tapered circumferential surfaces; and connection means at the second end of each body part, each connected to a pipe, whereby the two pipes are in fluid flow connection and are mutually rotatable, one to the other.

2. The sealed pipe swivel joint of claim 1, wherein the compression means comprises first and second flange members secured to the first and second body parts respectively and concentric with the body parts and said compression means including spring-loaded clamping members pressing the two flanges towards each other uniformly around the circumference of the flanges.

3. The sealed pipe swivel joint of claim 2, wherein the clamping members comprise interacting threaded means capable of being threadedly tightened to draw the first and second flange members towards each other.

4. The sealed pipe swivel joint of claim 1, wherein said connection means further comprises pressure-tight coupling means for rigidly, but removably coupling the body parts between two pipe end members, the coupling means comprises a first coupling member rigidly secured to the second end of a body part and a second coupling member designed to be rigidly secured to a pipe end, one of the two coupling members having a convex, annular male end portion, and the second of the coupling members having a mating concave, annular female end portion, the two annular end portions being in mutual overlapping contact and concentric to the body part and pipe end; and compression clamping means for securing the coupling members together under compressive stress.

5. A non-rotatable pressure-tight pipe joint for rigidly, but removably coupling two in-line pipe end members, the two pipe end members being in mated contact, the pipe joint comprising a first metal coupling member designed to be rigidly secured to and surrounding a first pipe end and a second coupling member designed to be rigidly secured to and surrounding a second pipe end, one of the two coupling members having a convex, annular male end portion, and the second of the coupling members having a mating concave, annular female portion, the two annular end portions being in mutual mating contact and both being concentric to the two pipe ends; and compression clamping means for immovably securing the pipe ends, the coupling members and the annular end portion in contact, under compressive stress; wherein said two coupling members are threadedly connected to the two pipe ends respectively; and wherein said first pipe end has an external bevel and the second pipe end has a mating internal bevel, and the external and internal beveled ends are designed to be held by the coupling joint in mating contact.

* * * * *